March 1, 1932.  A. F. BLESSING  1,847,919
POST SAW
Filed Dec. 5, 1930
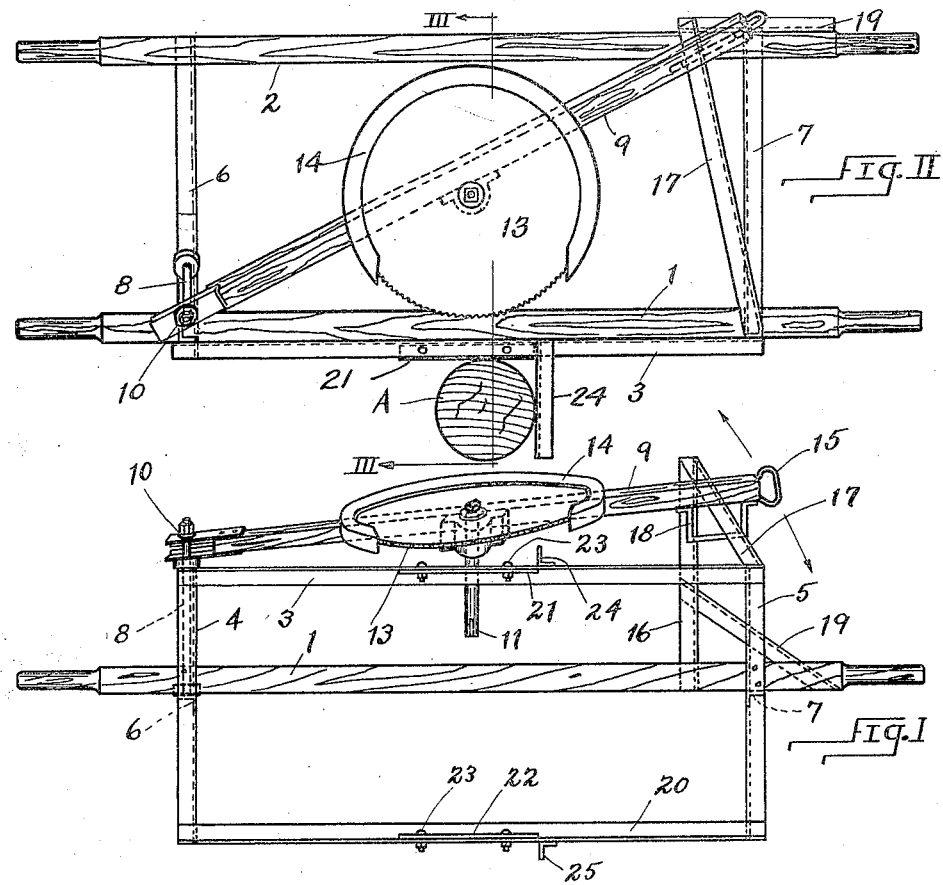
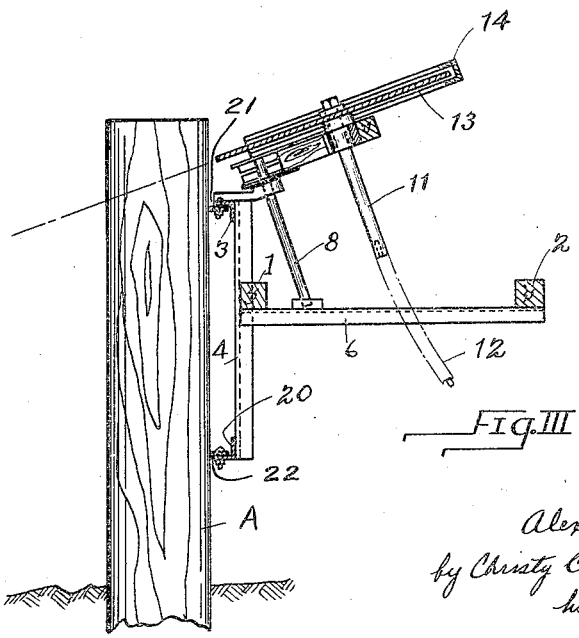
INVENTOR
Alexander F. Blessing
by Christy Christy and Wharton
his attorneys Patented Mar. 1, 1932

1,847,919

UNITED STATES PATENT OFFICE

ALEXANDER F. BLESSING, OF INDIANA, PENNSYLVANIA

POST SAW

Application filed December 5, 1930. Serial No. 500,262.

This invention relates to a portable power saw.

As is well known, it is universal practice to saw off at an angle the upper end of guard posts along roadways, and posts used for generally similar purposes. When sawed by manual operation, as has been usual, this constitutes a relatively slow and laborious operation.

The object of the invention is to provide an inexpensive, light, and portable saw, which is power operated, and which may be positioned against the posts and the like to cut off their tops at the desired angle.

In the accompanying drawings Figure I is a front elevation of my portable power-operated saw; Figure II is a plan view thereof; and Figure III is a cross sectional view, taken on the line III—III of Figure II, and showing the saw structure in operative position with respect to the work.

In the drawings reference numerals 1 and 2 designate two parallel, and longitudinally extending, handles by which the frame structure and saw may be carried and held in operative position. The frame comprises a longitudinally extending front upper bar 3, to which are attached bars 4 and 5 extending at right angles to bar 2. Intermediate their length, each of the bars 4 and 5 is connected to the forward handle 1. Mutually spaced cross members 6 and 7, extend between the two handles 1 and 2 to maintain them in rigidly spaced relation.

Mounted on cross member 6, and extending angularly upward therefrom is a pivot post 8, on which the saw carrying arm 9 is pivotally mounted at 10. Revolubly mounted in arm 9 is the saw shaft 11, arranged for connection to a flexible shaft 12, and carrying the circular saw 13. A saw guard 14, is carried by the arm 9 to surround saw 13.

Saw 13 is mounted intermediate the length of arm 9, and at the outer end of the arm is a handle 15, by which the arm, carrying the saw, may be swung about its pivot, to hold it in contact with the work, or withdraw it within the limits of the saw frame.

Extending upwardly from rear handle 2 is a vertical member 16, and an angularly disposed cross member 17 extends from this upright member to the longitudinal front bar 3 of the structure. Extending downwardly from pivoted arm 9 is a guide stirrup 18, which underlies this cross member 17. A brace 19 extends diagonally from vertical members 16 to rear handle 2.

A front lower bar 20 extends between vertical members 4 and 5, being connected to them at or adjacent their lower ends. Post contacting strips 21 and 22, are attached by bolts 23 to the upper front bar 3 and lower front bar 20 respectively. Extending outwardly at right angles to the upper front bar 3 and lower front bar 20 are mutually aligned positioning members 24 and 25 arranged to contact the post A.

In use of the saw, the frame is carried by two operators, who take hold of handles 1 and 2, and bring the frame into position at the desired elevation, with the strips 21 and 22, and extending members 24 and 25, in contact with the post A which is to be cut. When so positioned the angle of cutting is uniform with all posts which are truly set in the vertical.

When the frame is so positioned, one of the operators, the one to the right in Figures I and II grasps the handle 15 on arm 9, and swings the saw forwardly until it has cut through the post. During this action he may pull up on the arm 9 so that stirrup 18 bears firmly against the under side of cross member 17. This prevents wobbling of the saw carrying arm 9, even though the pivotal connection between the arm and the pivot post 8 be loose. Forward movement of the saw is positively limited by contact of stirrup 18 with the vertical member 5 at the front of the frame.

I claim as my invention:

1. Power operated and manually supportable post topping apparatus comprising horizontally positioned carrying handles, a light frame structure mounted on said handles, said frame structure comprising positioning members mutually mounted at an angle to abut a post at two separated regions of its periphery and position the frame structure at right angles to the vertical plane of the post, a saw-carrying arm spaced vertically from the horizontal plane of the carrying handles and pivotally supported on the frame wholly to overlie the same, said saw-carrying arm being mounted to swing through a plane inclined to the horizontal, and a circular saw having power operable connections mounted on said arm.

2. Power operated and manually supported post topping apparatus comprising a pair of longitudinal and horizontally spaced handle stringers, a light frame structure mounted on said stringers, said frame structure comprising a vertically spaced pair of positioning assemblies arranged each to abut a post and to position the frame structure at right angles to the post, a saw-carrying arm spaced vertically from the horizontal plane of the handle stringers and pivotally supported on the frame wholly to overlie the same, said saw-carrying arm being mounted to swing through a path inclined to the horizontal, a terminal handle on said arm and lying beyond one end of the frame in the terminal region of the handle stringers, and a circular saw having power operable connections mounted on said arm.

3. Power operated and manually supportable post topping apparatus comprising a pair of longitudinal and horizontally spaced handle stringers, a light frame structure mounted on said stringers, said frame structure comprising a vertically spaced pair of positioning assemblies arranged each to abut a post and to position the frame structure at right angles to the post, a saw-carrying arm spaced vertically from the horizontal plane of the handle stringers and pivotally supported on the frame wholly to overlie the same, said saw-carrying arm being mounted to swing through a path inclined to the horizontal, a terminal handle on said arm and lying beyond one end of the frame in the terminal region of the handle stringers, a guide bar extending transversely and forming an element of the frame, a stirrup depending from the saw-carrying arm and loosely embracing said guide bar, and a circular saw having power operable connections mounted on said carrying arm.

4. Power operated and manually supportable post topping apparatus comprising horizontally positioned carrying handles, a light frame structure mounted on said handles, said frame structure comprising positioning members mutually mounted at an angle to abut a circular post at two separated regions of its diameter and to position the frame structure at right angles to the vertical plane of the post, a saw-carrying arm spaced vertically from the horizontal plane of the carrying handles and pivotally supported on the frame wholly to overlie the same, said saw-carrying arm being mounted to swing through a path inclined to the horizontal, a terminal handle on said arm and lying beyond one end of the frame in the terminal region of the handle stringers, a guide bar extending transversely and forming an element of the frame, a stirrup depending from the saw-carrying arm and loosely embracing said guide bar, and a circular saw having power operable connections mounted on said carrying arm.

5. Power operated and manually supportable post topping apparatus comprising a pair of longitudinal and horizontally spaced handle stringers, a light frame structure mounted on said stringers, said frame structure comprising a vertically spaced pair of positioning assemblies each assembly comprising two positioning members mounted at an angle to each other to abut a circular post at two separated regions of its periphery and position the frame at right angles to the vertical plane of the post, a saw-carrying arm spaced vertically from the horizontal plane of the handle stringers and pivotally supported on the frame wholly to overlie the same, said saw-carrying arm being mounted to swing through a path inclined to the horizontal, a terminal handle on said arm and lying beyond one end of the frame in the terminal region of the handle stringers, and a circular saw having power operable connections mounted on said arm.

In testimony whereof I have hereunto set my hand.

ALEXANDER F. BLESSING.